Nov. 28, 1961 L. J. GOLDSMITH 3,011,062
TIDE-OPERATED POWER DEVICE
Filed Jan. 8, 1960
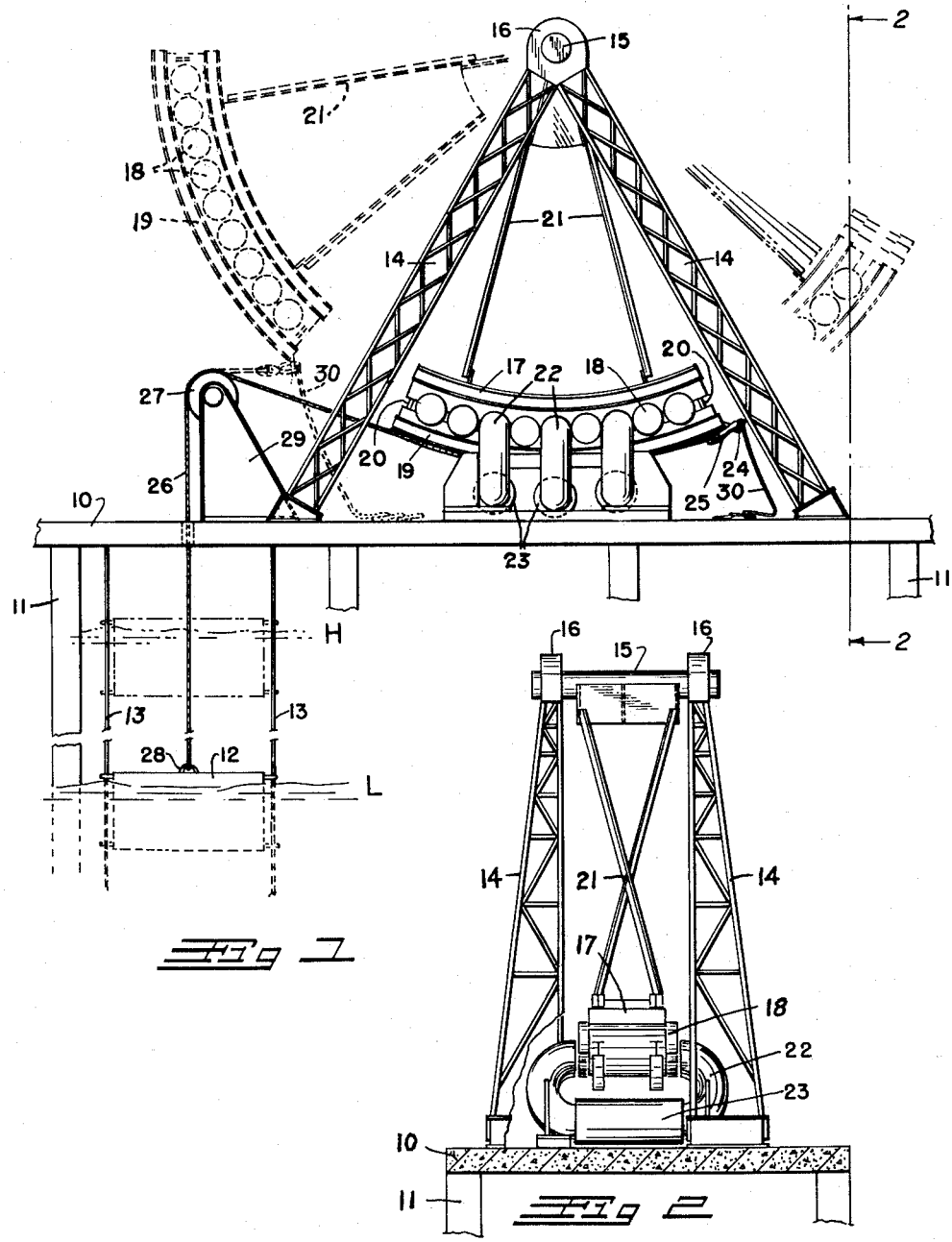
INVENTOR.
LEO. J. GOLDSMITH.
BY
ATTORNEY

United States Patent Office 3,011,062
Patented Nov. 28, 1961

3,011,062
TIDE-OPERATED POWER DEVICE
Leo Jean Goldsmith, 1363 Elevation Road,
San Diego 10, Calif.
Filed Jan. 8, 1960, Ser. No. 1,241
5 Claims. (Cl. 290—53)

This invention relates to means for generating electric current in consequence of the rise and fall of ocean tides and has for its principal object the provision of a comparatively simple, economical and highly efficient mechanism which will accumulate and store power during an ebbing tide and which will deliver the stored power to an electric generator during a rising tide.

A further object of the invention is to provide means for elevating a weight in consequence of an ebbing tide so that the static energy of the elevated weight can be employed for power purposes during the period of a rising tide.

A further object of the invention is to provide a highly efficient electrical generator in which the generation of current will be efficiently accomplished by the gravitational oscillation of a pendulum.

Other objects and advantages reside in the invention as will become more apparent in the following detail description of a specific embodiment thereof.

In the following detailed description of the invention, reference is had to the accompanying drawing which forms a part hereof. Like numerals refer to like parts in all views of the drawing and throughout the description.

In the drawing:

FIG. 1 is a side elevational view of a form of the improved tide-operated electrical generator; and FIG. 2 is a partially broken away end view thereof, taken on the line 2—2, FIG. 1.

The tide-operated electrical generator is mounted upon a platform 10 supported upon suitable piles 11 above tidal water. A comparatively heavy, yet buoyant, weighted float 12 floats upon the water below the platform 10 between suitable vertical guide members 13. At low tide, indicated at L, the weight 12 will be a considerable distance below the bottom of the platform 10 and as the tide rises, the weight will ascend therewith to a high tide position, indicated at H in relatively close-spaced relation to the platform 10. The differential in elevation will, of course, equal the tidal difference at the point where the device is being used.

A double A-frame 14 of structural members is erected on the platform 10 to support a pendulum shaft 15 in suitable anti-friction bearings 16. The A-frame is sufficiently high to support the pendulum shaft 15 at an elevation above the platform 10 in excess of the extreme tide range at the point where the device is being used. A free swinging pendulum 21 is supported from the pendulum shaft 15.

In the embodiment illustrated, the pendulum 21 supports an upper arcuate armature frame 17 to which an arcuate plurality of permanent armature magnets 18 are clamped by means of lower arcuate armature members 19 through the medium of suitable clamp bolts 20. The magnets 18 are positioned in circumferential alignment with their axes parallel to the axis of the pendulum shaft 15 and are positioned in the pendulum so that all correspond in polarity. The armature frame 17, the armature members 19, the bolts 20 and all other metallic members in the pendulum are formed from non-magnetic materials such as aluminum so as to be unaffected by the magnetism in the magnetized permanent armature magnets 18.

The armature magnets 18 swing between the pole pieces of generator field coils to generate alternating electric currents in the latter coils according to the well-known principles of electrical generation. The electrical structure could be reversed with the permanent magnets stationary and the field coils mounted on the pendulum without changing the principle of operation.

In the embodiment illustrated, a plurality of laminated horse-shoe-type field poles 22 are positioned below the pendulum so that their opposed extremities will be positioned in alignment with the opposite extremities of the armature magnets 18. A field coil 23 is wound on each of the field poles 22 and the terminals of these coils are connected either in parallel or in series, as desired, in any desired electrical circuit.

The pendulum is provided with a projecting attachment member 24 over which a latch ring 25 carried on the extremity of a retracting cable 26 can be positioned. The retracting cable extends over a cable sheave 27 thence downwardly to a permanent connection 28 with the weighted float 12. The sheave 27 is supported upon any suitable supporting structure 29 from the platform 10.

Let us assume that the pendulum is in the "at rest" or solid line position of FIG. 1 and that the weighted float 12 is in the high tide position H. The ring 25 of the cable 26 is slipped over the attachment lug 24 of the pendulum. As the tide ebbs, the weighted float 12 will descend so as to gradually elevate the pendulum to the elevated position, indicated in broken line in FIG. 1. When the low tide position L is reached, the ring 25 is disengaged from the attachment member 24 in any desired manner, such as by pulling a release cable 30, and the pendulum is allowed to swing freely between the field poles 22 while the weighted float 12 descends with the tide. The swinging pendulum will generate pulsating, alternating electrical currents in the field coils 23 which may be rectified for battery charging or used for any desired purpose.

While the specific form of the improvement has been described and illustrated herein, it is to be understood that the same may be varied within the scope of the appended claims, without departing from the spirit of the invention.

Having thus described the invention what is claimed and desired secured by Letters Patent is:

1. A tide actuated power device comprising: a weighted float; means for guiding the rise and fall of said float with an incoming and outgoing tide; a pendulum support; a pendulum pivotally suspended from support; detachable connecting means connected to said weighted float; means for connecting said connecting means to said pendulum when said weighted float is in a high tide position to elevate said pendulum in consequence of the descent of said float to the low tide position; means for releasing said connecting means from said pendulum when the latter is in the low tide position to allow said pendulum to swing freely; and means for converting the swinging oscillations of said pendulum as a usable power source.

2. A tide actuated power device as described in claim 1 in which the means for converting comprising stationary electrical armature elements mounted on said pendulum and electrical field elements mounted adjacent the path of swing of said armature elements in which electricity will be generated by the swinging movements of said armature elements.

3. A tide actuated power device as described in claim 1 in which the means for converting comprises a permanent magnet mounted on so as to swing with said pendulum; and an electrical field coil positioned to be alternately crossed by said magnet during the swinging of said pendulum so as to magnetically generate electrical current in said coil.

4. A tide actuated power device as described in claim 3 having a plurality of said permanent magnets and a plurality of said field coils and a pole piece in each coil, sadi pole pieces being in a U-shape with their opposite extremities positioned closely adjacent to the path of swing of the extremities of said permanent magnets.

5. A tide actuated power device as described in claim 4 having a concentric armature frame carried by said pendulum and having means clamping said permanent magnets against said frame in side-by-side relation in polarity correspondence with their axes parallel to the axis of swing of said pendulum.

References Cited in the file of this patent
UNITED STATES PATENTS
816,934     Newell _____ Apr. 3, 1906